(12) United States Patent
Liang et al.

(10) Patent No.: US 10,172,091 B2
(45) Date of Patent: Jan. 1, 2019

(54) DISPLAY ASSEMBLY AND MOBILE TERMINAL HAVING THE SAME

(71) Applicant: Wuhan China Star Optoelectronics Technology Co., Ltd., Wuhan, Hubei (CN)

(72) Inventors: Chao Liang, Guangdong (CN); Qingcheng Zuo, Guangdong (CN); Xiaoling Yuan, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 140 days.

(21) Appl. No.: 15/300,962

(22) PCT Filed: Sep. 20, 2016

(86) PCT No.: PCT/CN2016/099414
§ 371 (c)(1),
(2) Date: Sep. 30, 2016

(87) PCT Pub. No.: WO2018/035903
PCT Pub. Date: Mar. 1, 2018

(65) Prior Publication Data
US 2018/0184370 A1    Jun. 28, 2018

(30) Foreign Application Priority Data
Aug. 24, 2016 (CN) .......................... 2016 1 0717742

(51) Int. Cl.
| H04B 1/38 | (2015.01) |
| H04W 52/02 | (2009.01) |
| G09G 3/20 | (2006.01) |

(52) U.S. Cl.
CPC ............ *H04W 52/027* (2013.01); *G09G 3/20* (2013.01); *Y02D 70/00* (2018.01)

(58) Field of Classification Search
CPC ........... H04W 52/027; H04M 1/72519; H04M 1/72583
(Continued)

(56) References Cited

U.S. PATENT DOCUMENTS 4,630,314 A * 12/1986 Smith ...................... H04B 7/22
375/285
5,812,786 A * 9/1998 Seazholtz ............ H04M 11/062
370/465
(Continued)

FOREIGN PATENT DOCUMENTS

| CN | 103871383 A | 6/2014 |
| CN | 105243982 A | 1/2016 |
(Continued)

*Primary Examiner* — April G Gonzales
(74) *Attorney, Agent, or Firm* — Andrew C. Cheng

(57) ABSTRACT

The invention provides a display assembly and a mobile terminal. The display assembly includes a display and a system chip. The display includes a display body and a drive chip mounted on the display body. The system chip includes a data analyzing module and a data sending module. The drive chip includes a receiving module and a processing module. The data analyzing module receives image data and analyzes the image data to obtain high bit data of the image data when the mobile terminal is in an idle status. The data sending module sends the high bit data of the image data to the receiving module. The processing module receives the high bit data of the image data sent by the receiving module and sends the high bit data of the image data to the display body to display.

5 Claims, 2 Drawing Sheets

(58) Field of Classification Search
USPC .......................................................... 455/566
See application file for complete search history.

(56) References Cited

U.S. PATENT DOCUMENTS

| | | | | |
|---|---|---|---|---|
| 6,246,695 | B1* | 6/2001 | Seazholtz | H04M 11/062 370/468 |
| 6,424,636 | B1* | 7/2002 | Seazholtz | H04M 11/062 370/295 |
| 6,690,344 | B1* | 2/2004 | Takeuchi | G09G 3/3473 345/204 |
| 6,801,178 | B2* | 10/2004 | Nitta | G09G 3/2011 345/89 |
| 9,367,495 | B1* | 6/2016 | Forbes | G06F 13/40 |
| 2002/0050968 | A1* | 5/2002 | Tanaka | G02F 1/13452 345/87 |
| 2002/0186213 | A1* | 12/2002 | Koizumi | G06F 3/147 345/208 |
| 2002/0186230 | A1* | 12/2002 | Kudo | G09G 3/3607 345/690 |
| 2003/0011549 | A1* | 1/2003 | Murahashi | G09G 3/3644 345/87 |
| 2007/0132674 | A1* | 6/2007 | Tsuge | G09G 3/2014 345/77 |
| 2010/0220080 | A1* | 9/2010 | Kojima | G09G 3/3291 345/204 |
| 2010/0277517 | A1* | 11/2010 | Sayre | H04N 17/04 345/690 |
| 2011/0109668 | A1* | 5/2011 | Takeuchi | G09G 3/3413 345/691 |
| 2011/0206290 | A1* | 8/2011 | Katayama | G09G 3/3648 382/250 |
| 2013/0275786 | A1* | 10/2013 | Tanaka | G06F 1/3234 713/320 |

FOREIGN PATENT DOCUMENTS

| | | |
|---|---|---|
| CN | 105679279 A | 6/2016 |
| CN | 10587479 A | 8/2016 |

\* cited by examiner

DISPLAY ASSEMBLY AND MOBILE TERMINAL HAVING THE SAME

BACKGROUND OF THE INVENTION

1. Field of the Invention

The present invention relates to mobile terminals, particularly relates to a display assembly and a mobile terminal having the display assembly.

2. Description of Related Art

With the development of mobile phones, the phones have more and more functions, and the size of the display of the phones becomes larger and larger, which correspondingly increases the power consumption. How to decrease the power consumption is the problem which the manufacturers need to solve at present with the requirement of not high display quality. However, the operations are carried in the drive chip of the display, and the system of the mobile phone needs to send all of data to the drive chip to handle, which also requires large power consumption.

SUMMARY OF THE INVENTION

In order to overcome the deficiency of the related art, the purpose of the present invention is to provide a display assembly and a mobile terminal for decreasing the power consumption.

The present invention includes a display assembly. The display assembly includes a display and a system chip. The display includes a display body and a drive chip mounted on the display body. The system chip includes a data analyzing module and a data sending module. The drive chip includes a receiving module and a processing module. The data analyzing module receives image data and analyzes the image data to obtain high bit data of the image data when the mobile terminal is in an idle status. The data sending module sends the high bit data of the image data to the receiving module. The processing module receives the high bit data of the image data sent by the receiving module and sends the high bit data of the image data to the display body to display.

As a further improvement, the system chip is connected to the drive chip via a first data transmitting channel and a second data transmitting channel; the system chip further comprises a control module; the control module is configured to close the first data transmitting channel when the data sending module receives the high bit data of the image data, and to send the high bit data of the image data to the display body to display via the second data transmitting channel.

As a further improvement, the system chip is further connected to the drive chip via a source line.

As a further improvement, the system chip is further connected to the drive chip via a control line.

As a further improvement, the display is a liquid crystal display.

The present invention provides a mobile terminal. The mobile terminal includes a display assembly. The display assembly includes a display and a system chip. The display includes a display body and a drive chip mounted on the display body. The system chip includes a data analyzing module and a data sending module. The drive chip includes a receiving module and a processing module. The data analyzing module receives image data and analyzes the image data to obtain high bit data of the image data when the mobile terminal is in an idle status. The data sending module sends the high bit data of the image data to the receiving module. The processing module receives the high bit data of the image data sent by the receiving module and sends the high bit data of the image data to the display body to display.

As a further improvement, the system chip is connected to the drive chip via a first data transmitting channel and a second data transmitting channel; the system chip further comprises a control module; the control module is configured to close the first data transmitting channel when the data sending module receives the high bit data of the image data, and to send the high bit data of the image data to the display body to display via the second data transmitting channel.

As a further improvement, the system chip is further connected to the drive chip via a source line.

As a further improvement, the system chip is further connected to the drive chip via a control line.

As a further improvement, the display is a liquid crystal display.

As a further improvement, the mobile terminal is a mobile phone.

The system chip of the invention analyzes the image data to obtain the high bit data of the image data and sends the high bit data to the drive chip, thereby reducing the amount of data to decrease the power consumption of the mobile terminal.

DETAILED DESCRIPTION OF THE PREFERRED EMBODIMENT

The following content combines with the figures and the embodiments for describing the present invention in detail. It is obvious that the following embodiments are only some embodiments of the present invention. For an ordinary person skilled in the art without any creative effort, other embodiments obtained thereby are still covered by the present invention.

Figure 1:
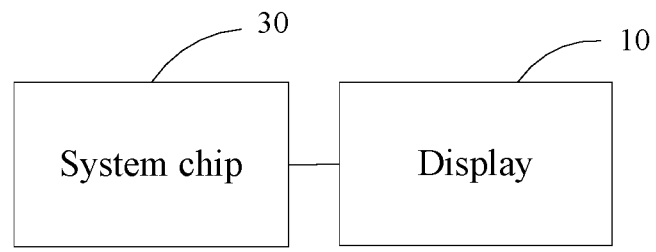
FIG. 1 is a block diagram of a display assembly in accordance with one embodiment.
Figure 2:
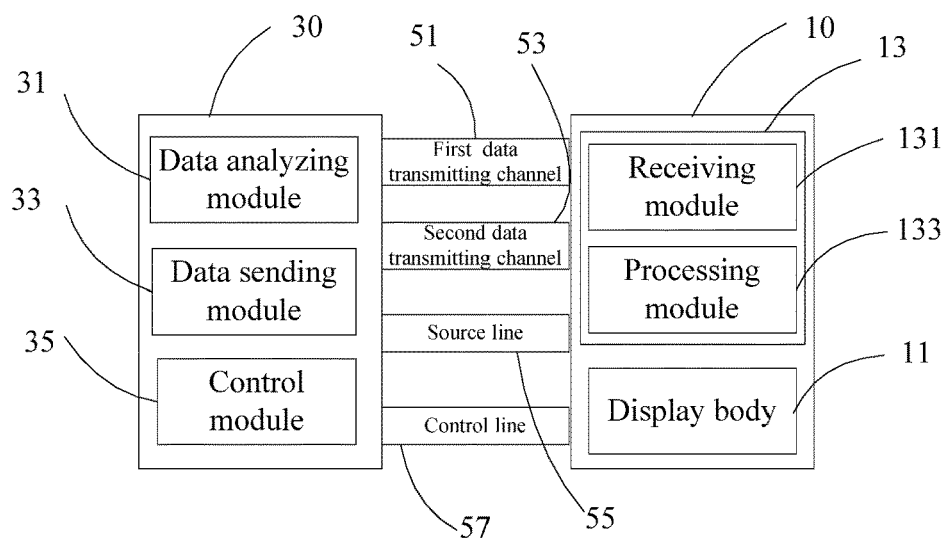
FIG. 2 is another block diagram of a display assembly in accordance with one embodiment.

Referring to FIGS. 1 and 2, a mobile terminal in accordance with one embodiment includes a display assembly. The display assembly includes a display 10 and a system chip 30. In the embodiment, the mobile terminal is a mobile phone, and the display is a liquid crystal display.

The display 10 includes a display body 11 and a drive chip 13 mounted on the display body 11. The drive chip 13 includes a receiving module 131 and a processing module 133.

The system chip 30 includes a data analyzing module 31, a data sending module 33, and a control module 35. The system chip 30 is connected to the drive chip 13 via a first data transmitting channel 51 and a second data transmitting channel 53.

The data analyzing module 31 is used for receiving image data and analyzing the image data to obtain high bit data of the image data. The control module 35 is used for closing the first data transmitting channel 51 when the data sending module 33 receives the high bit data of the image data. The data sending module 33 is further used for sending the high bit data of the image data to the receiving module 131 of the drive chip 13 via the second data transmitting channel 53. The processing module 133 is used for sending the high bit data of the image data from the receiving module 131 to the display body 11 of the display 10 to display.

In use, the mobile terminal is in the idle status, and the data analyzing module 31 receives image data and sends high bit data of the image data to the data sending module 33. The control module 35 closes the first data transmitting channel 51 when the data sending module 33 receives the high bit data of the image data. The data sending module 33 sends the high bit data of the image data to the receiving module 131 of the drive chip 13 via the second data transmitting channel 53. The processing module 133 sends the high bit data of the image data from the receiving module 131 to the display body 11 of the display 10 to display.

In the embodiment, the system chip 30 is also connected the drive chip 13 via a source line 55 and a control line 57.

The system chip 30 analyzes the image data to obtain the high bit data of the image data and sends the high bit data to the drive chip 13, thereby reducing the amount of data to decrease the power consumption of the mobile terminal. In addition, the system chip 30 closes the first data transmitting channel 51 before sending the high bit data of the image data to the drive chip 13, thereby reducing the amount of data transmitting channels to further decrease the power consumption of the mobile terminal.

For a person skilled in the art, obviously, the present invention is not limited to the above exemplary embodiments disclosed herein. Besides, without deviating the spirit and the basic feature of the present invention, other specific forms can also achieve the present invention. Therefore, no matter from what point of view, the embodiments should be deemed to be exemplary, not limited. The range of the present invention is limited by the claims not by the above description. Accordingly, the embodiments are used to include all variation in the range of the claims and the equivalent requirements of the claims. It should not regard any reference signs in the claims as a limitation to the claims.

What is claimed is:

1. A display assembly of a mobile terminal, comprising a display and a system chip, the display comprising a display body and a drive chip mounted on the display body; the system chip comprising a data analyzing module and a data sending module; the drive chip comprising a receiving module and a processing module; the data analyzing module configured to receive image data and analyze the image data to obtain high bit data of the image data when the mobile terminal is in an idle status; the data sending module configured to send the high bit data of the image data to the receiving module; the processing module configured to receive the high bit data of the image data sent by the receiving module and to send the high bit data of the image data to the display body to display; and wherein the system chip is connected to the drive chip via a first data transmitting channel and a second data transmitting channel; the system chip further comprises a control module; the control module is configured to close the first data transmitting channel when the data sending module receives the high bit data of the image data, and to send the high bit data of the image data to the display body to display via the second data transmitting channel.

2. The display assembly according to claim 1, wherein the system chip is further connected to the drive chip via a source line.

3. The display assembly according to claim 1, wherein the system chip is further connected to the drive chip via a control line.

4. The display assembly according to claim 1, wherein the display is a liquid crystal display.

5. A mobile terminal, comprising a display assembly, the display assembly comprising a display and a system chip, the display comprising a display body and a drive chip mounted on the display body; the system chip comprising a data analyzing module and a data sending module; the drive chip comprising a receiving module and a processing module; the data analyzing module configured to receive image data and analyze the image data to obtain high bit data of the image data when the mobile terminal is in an idle status; the data sending module configured to send the high bit data of the image data to the receiving module; the processing module configured to receive the high bit data of the image data sent by the receiving module and to send the high bit data of the image data to the display body to display; and wherein the system chip is connected to the drive chip via a first data transmitting channel and a second data transmitting channel; the system chip further comprises a control module; the control module is configured to close the first data transmitting channel when the data sending module receives the high bit data of the image data, and to send the high bit data of the image data to the display body to display via the second data transmitting channel.

\* \* \* \* \*